United States Patent [19]

Demeritt et al.

[11] Patent Number: 5,216,730
[45] Date of Patent: Jun. 1, 1993

[54] ATHERMAL OPTICAL TRANSMITTER AND METHOD

[75] Inventors: Jeffery A. Demeritt, Painted Post; Mark L. Morrell, Horseheads, both of N.Y.

[73] Assignee: Corning Incorporated, Corning, N.Y.

[21] Appl. No.: 810,179

[22] Filed: Dec. 19, 1991

[51] Int. Cl.⁵ .............................................. G02B 6/32
[52] U.S. Cl. ..................................................... 385/33
[58] Field of Search ........................ 385/33, 27, 31, 34

[56] References Cited

U.S. PATENT DOCUMENTS

4,636,030 1/1987 Carter et al. ...................... 385/33 X
5,066,093 11/1991 Greil et al. ............................ 385/33

Primary Examiner—Akm E. Ullah
Attorney, Agent, or Firm—Kees van der Sterre

[57] ABSTRACT

A transmitter optical subassembly (TOSA) for transmitting an optical signal into the end of an optical fiber connected thereto comprises a mounting tube containing a convergent lens adapted to focus light from a solid state light source at one end of the tube to an optical fiber terminating at a fiber endface in a fiber receiver at the other end of the tube, the lens being formed of a glass having thermal characteristics compatible with those of the mounting tube and other metal components of the subassembly and the fiber receiver being mounted on the tube at attachment points substantially coplanar with the plane of the fiber endface.

19 Claims, 2 Drawing Sheets

ATHERMAL OPTICAL TRANSMITTER AND METHOD

BACKGROUND OF THE INVENTION

The present invention relates generally to opto-electronic transmitters or light sources. More particularly, the invention relates to optical transmitters referred to in the art as transmitter optical subassemblies (TOSAs) which can efficiently couple optical power from a solid state light source such as a light-emitting diode into an optical fiber coupled to the source.

Devices of this type are known which are connectorized, i.e., fitted to accept an optical fiber terminated with a standard fiber connector end terminal of the kind used in standard ST, SC, or similar connectors. Connectorization can insure that, when the properly terminated end of an optical fiber is connected to the device, the coupling of optical signals from the source into the fiber can be achieved repeatably and without unacceptable signal losses.

Transmitter optical subassemblies are known, for example, from U.S. Pat. No. 5,040,862. The subassemblies of this patent comprise several common elements disposed within a suitable enclosure, including a light-emitting diode such as a laser diode which can be modulated to generate an optical signal, and a light-focusing or convergent lens to focus the output from the light source as a source image at an optical coupling point corresponding to the endface of an optical fiber terminating within the enclosure.

The device of this patent further comprises an integral terminal connector member such as a receiving ferrule, adapted to receive and position the input end of a connectorized or otherwise suitably terminated optical fiber. The ferrule is positioned so that the fiber endface will be located at a position within the enclosure where maximum coupling of optical power into the end of the fiber can be provided.

While a variety of transmitter optical subassemblies of this type are known, most of the existing designs exhibit characteristics which significantly limit coupling efficiency and/or repeatability in use. For example, in all designs employing convergent lenses, temperature changes occurring during device operation can affect the refractive index, thickness, and radius of curvature of the lens elements. The result is a change in the location of the source image, i.e., the focal point or focal plane in which light from the light source is focused for coupling into the fiber.

In addition, the design of these devices is frequently such that minor alignment errors in the course of device assembly, such as small errors in the positioning of the solid state light source, lens, or connector end within the final assembly, can substantially affect the signal coupling efficiency of the device. This uneconomically decreases the select rate for the assembly process.

The art is also aware that these devices are subject to significant performance degradation when subjected to minor levels of applied mechanical stress in use. This places constraints on the design of optical systems employing the devices, in order to avoid mounting configurations wherein such stress might be encountered.

Finally, existing connectorized device designs have favored connector placement at locations which position the receiving ends of optical fibers connected thereto at points of maximum optical power coupling. The effect of such positioning is that very small changes in the position of the fiber end disadvantageously result in very large changes in the amount of optical power coupled into the fiber.

It is therefore a principal object of the present invention to provide a transmitter optical subassembly which is more resistant to temperature changes than the prior art devices, and to provide designs for such devices which render them less sensitive to applied mechanical stresses.

It is a further object of the invention to provide optical subassembly designs which reduce the harmful effects on device performance of minor rotational or translational misalignments in light source, lens and/or terminal components during device manufacture.

It is a further object of the invention to provide a design for a transmitter optical subassembly which exhibits reduced sensitivity to connected fiber positioning than prior art subassemblies.

It is a further object of the invention to provide a method for manufacturing a transmitter optical subassembly offering improved repeatability and precision in the production process.

Other objects and advantages of the invention will become apparent from the following description thereof.

SUMMARY OF THE INVENTION

The present invention provides transmitter optical subassemblies fabricated of metal mounting components and glass lens elements which are composed of materials specially selected for thermal compatibility. This careful selection of compatible materials provides a subassembly wherein optical coupling efficiency from a solid state light source such as a laser diode is much less affected by temperature changes than is coupling efficiency in devices formed of conventional materials. Hence, in the present designs, thermal changes in the location of the light source and/or lens focal parameters are substantially offset by concomitant changes in the dimensions of the the metal components of the device Thus movement of the focused image of the light source relative to the end of an optical fiber connected to the device for coupling with the optical signal generated by the source is reduced.

A further characteristic of the transmitter provided in accordance with the invention is the position of the source-to-fiber optical coupling point with respect to the junction or joint between the lens-source combination and the fiber connection hardware employed. We have found that the proper positioning of this joint relative to the optical coupling point (the fiber endface) can effect a substantial reduction in the levels of optical coupling loss to be anticipated due to manufacturing misalignment of the fiber connection hardware at the time it is welded or otherwise attached to the remainder of the subassembly.

In a preferred embodiment, the transmitter subassembly of the invention also employs physical shielding means in the form of a protective sheath or so-called strength tube, typically a rigid tube coaxial with but spaced from the optical mounting tube which at least partially and preferably substantially completely encloses the subassembly. This shielding protects the internal structure supporting the optical elements of the device from mechanical distortion, so that stress-induced performance losses may be avoided.

Finally, if desired, the transmitter subassembly of the invention can readily provide for adjustment of the optical coupling point (the endface of an optical fiber connected to the assembly) to an offset position slightly translated along the optical axis from the location of the focused image of the light source. This offset, if properly limited, can substantially reduce variations in coupled power resulting from slight misalignments of the fiber end relative to the source image point which may occur during manufacturing or in use.

In a first aspect, then, the invention comprises an improved optical transmitter module or subassembly for transmitting an optical signal into the end of an optical fiber connected thereto. Included within the subassembly is a convergent lens, typically composed of an appropriate glass, which is permanently mounted within an optical mounting tube for supporting the lens and other components of the subassembly.

The optical mounting tube is a unitary, preferably one-piece, cylindrical metal tube, the opposing ends of which, for optical reference, are referred to as object and image ends of the tube. The lens is mounted in the tube such that the lens optical axis is substantially parallel with the center axis of the tube. Further, the tube is of sufficient length that, for objects located at the object end of the tube, (e.g., a light source), the lens will form an image of the object (e.g., will focus light from the light source) at or near the image end of the tube.

The subassembly further comprises a solid state light source, such as a light emitting or laser diode light source, mounted at the object end of the tube. This source will typically be mounted at a position on or proximate to the lens optical axis, so that light from the source and traversing the lens will be focused at a point which is also on or proximate to the lens optical axis. The image plane containing this focal point, termed the source image point for the subassembly, is referred to for reference as the source image plane of the device.

Also included in the subassembly are optical fiber receiving means mounted at the image end of the tube, which means means are adapted to accept and hold an optical fiber into which optical signals to be generated within the subassembly are to be coupled. The selected receiving means, which typically comprise a receiving ferrule or the like for accepting and retaining a end-terminated optical fiber, are positioned such that, for an optical fiber fully inserted therein and terminating at a fiber endface, the fiber endface will be disposed at or closely proximate to the source image point for the subassembly. The position of the fiber endface is the actual optical coupling point for the subassembly.

As above noted, to insure consistent optical performance in a subassembly such as described, proper attachment of the optical fiber receiving means to the optical mounting tube is necessary. We have determined that consistent device performance is best achieved by attaching the receiving means to the mounting tube at one or more attachment points lying within or closely proximate to the source image plane for the subassembly. Thus the attachment points and the optical coupling point for the device lie substantially in a common plane. This substantially reduces coupling errors caused by the invariable shifting of the receiving means during welding, soldering, or other attachment thereof to the remaining components.

In a particularly preferred embodiment, the subassembly will further comprise sheathing means, consisting for example of a rigid tubular shielding member spaced from but encasing and most preferably coaxial with the optical mounting tube. The particularly preferred sheathing means is a metal tube, termed a "strength tube", which is most preferably joined only to the optical fiber receiving means for the subassembly. This tube can fully protect the optical mounting tube and its contained optical components from distortion or misalignment due to applied stress.

In a second aspect, the invention comprises a method for making a transmitter optical subassembly for transmitting an optical signal into an optical fiber connected thereto. In accordance with that method, a convergent lens, composed preferably of an appropriate glass, is first mounted within an optical mounting tube.

Mounting will be in a manner such that the optical axis of the lens will fall within and preferably parallel with the center axis of the mounting tube. The mounting tube employed, which is a unitary and preferably one-piece cylindrical tube composed of an appropriate metal and having open ends referred to for optical reference as object and image ends, will have a length sufficient as above described to permit source imaging at or near the image end of the tube.

After the lens has been mounted, fixtured optical sensing means are positioned at the image end of the tube. Such means, which typically comprise a fixture-mounted optical pickup fiber, light sensor, or the like connected to an optical power meter or other power gauge, will be repeatably positioned by the dimensions of the fixture to lie on the lens optical axis, and at a location where a source image may be formed by the lens.

With the fixtured optical sensor positioned as described, a solid state light source is mounted at the object end of the tube. Before mounting, however, the source is first positioned so that light therefrom will be focused on the lens optical axis and at or closely proximate to location of the sensor. This is achieved by adjusting the source position to achieve a desired level of power coupling of light from the source into the sensing means.

The exact focal point for the source, referred to as the source image point, may fall exactly on the sensor or at a slight offset along the lens optical axis therefrom. The plane containing this point is called the source image plane for later reference. Of course, the final positioning of the source module will in all cases take into account such variables as tooling tolerances and thermal and other shifting caused by the welding or other attachment process used, as well as by such offset as may be made for the purpose of beam defocusing or the like.

After the source as been positioned and fixed to the mounting tube, optical fiber receiving means are positioned for mounting at the image end of the tube. Again, the receiving means may comprise a receiving ferrule for a terminated optical fiber, or it may comprise any other suitable mechanism for accepting and holding an optical fiber in the proper position in the device.

In order to fix the proper mounting position for the receiving means, such means will again incorporate an optical sensor such as an optical pickup fiber coupled to a power meter and terminating at a fiber endface. The endface position of the pickup fiber in this step will correspond exactly to the position in which an optical fiber endface will be held in the receiving means during actual later use of the subassembly.

The proper mounting position for the receiving means is that position at which the fiber endface is disposed on the optical axis and at or closely proximate to the source image plane for the subassembly, as determined by light from the source coupled into the fiber endface and detected at the power meter. The final location for the fiber endface is the actual optical coupling point for the device.

If, as hereinafter more fully described, it is desired to achieve some level of beam defocusing at the optical coupling point, then the receiving means may be displaced slightly along the lens optical axis for this purpose prior to final mounting. Generally, such displacements of the source image point away from the optical coupling point will involve displacements not exceeding ±250 microns, for subassemblies wherein the lens provides a source magnification of 4× at the image point.

Once the selected fiber receiving means have been properly positioned, permanent attachment thereof to the mounting tube is effected. Again, for repeatable subassembly performance, attachment is made at one or multiple attachment points which lie within or closely proximate to the selected source image plane for the subassembly. As previously explained, this location for the attachment points substantially reduces the adverse effects on optical coupling performance which would otherwise result from angular misalignment of the receiving means with the optical axis of the lens during manufacture, or from mispositioning of the fiber endface (optical coupling point) relative to the source image point during subsequent use of the device.

BRIEF DESCRIPTION OF THE DRAWINGS

The invention may be further understood by reference to the drawings wherein.

DETAILED DESCRIPTION

The selection of materials to achieve a transmitter optical subassembly exhibiting improved performance in accordance with the invention requires attention to both lens glass composition and metal composition for the structural components of the device, most critically the optical mounting tube. The glasses employed for lens construction are generally of the high-expansion optical type, so that desirable optical properties in combination with thermal properties appropriate for high device stability are achieved.

Among the known high-expansion optical glasses which may be used for subassembly lens fabrication are glasses of alkali phosphate, alkali fluoro-phosphate, alkali alumino-phosphate, and alkali alumino-fluoro-phosphate type. The preferred glasses will generally have average linear thermal expansion coefficients above about $125 \times 10^{-7}/°$ C. over the temperature range of 20°–300° C., more preferably in the $150–200 \times 10^{-7}/°$ C. regime over that temperature range.

Particularly preferred glasses are the alkali alumino-fluoro-phosphate glasses, optionally comprising significant proportions of divalent metal oxides, exhibiting moderate softening temperatures in combination with improved glass stability and good chemical durability. U.S. Pat. No. 4,362,819 provides specific examples of such preferred glasses. U.S. Pat. No. 4,391,915 discloses other moldable phosphate glasses useful for the production of molded lenses, while U.S. Pat. No. 4,447,550 describes glasses of lead borosilicate composition which also exhibit relatively low softening temperatures and could alternatively be used.

Specific examples of alkali aluminophosphate and fluoroaluminophosphate glasses which could be used for compatible lenses in accordance with the invention are reported in Table I below. The compositions in Table I are reported in weight percent as calculated from the glass batch, and average linear coefficients of thermal expansion are reported for each of the glasses.

TABLE I

| Glass Component | Lens Glasses | | |
|---|---|---|---|
| | 1 | 2 | 3 |
| $Li_2O$ | 2.0 | 1.87 | 1.8 |
| $Na_2O$ | 5.0 | 4.44 | 4.4 |
| $K_2O$ | — | 4.22 | 4.1 |
| ZnO | — | 18.0 | 14.3 |
| CaO | — | 3.76 | 3.7 |
| BaO | 20.1 | 10.3 | 10.1 |
| $Sb_2O_3$ | — | 12.4 | — |
| PbO | 24.2 | — | 16.6 |
| $Al_2O_3$ | 5.2 | 0.5 | 1.3 |
| $P_2O_5$ | 39.2 | 44.5 | 43.6 |
| F | 4.3 | — | — |
| Thermal Expansion Coefficient (20°–300° C.) | $150 \times 10^{-7}$ | $158 \times 10^{-7}$ | $161 \times 10^{-7}$ |

Compatibility between the selected lens glass and the metal materials making up structural components of the subassembly in general requires relatively good thermal expansion matching between the glass forming the lens and at least the metal forming the optical mounting tube. Based on present data, the difference in coefficient of expansion between these material should not exceed about 50 "points", i.e., a difference not exceeding $50 \times 10^{-7}/°$ C. between the average expansion coefficients of the materials. More preferably, a maximum difference of 30 points will be maintained.

Among the metals which are preferred for providing the metal components of the subassemblies of the invention are the austenitic stainless steels. These metals not only have thermal expansion coefficients in the same range as high expansion alkali phosphate optical glasses but also exhibit good sealing compatibility therewith.

Other metals can be substituted for the preferred stainless steel components, although the thermal properties of such other metals may be slightly less favorable for precision transmitters than the preferred steels. Examples of such other metals include the 400 series stainless steels and brass.

Table II below sets forth examples of metals which could be used for the mounting tube and other metal components of the subassembly, although such examples are intended to be merely illustrative of the wide range of metals which could be used.

TABLE II

| Metal | Thermal Expansion | Composition |
| --- | --- | --- |
| 304L stainless steel (austenitic) | $178 \times 10^{-7}$ | Fe + 2.0 Mn, 1.0 Si, 18–20 Cr, 8–12 Ni. |
| Inconel 718 nickel-steel alloy | $142 \times 10^{-7}$ | Fe + 50–55 Ni, 17–21 Cr, 4.75–5.4 Nb + Ta, 2.8–3.0 Mo. |
| cold-rolled steel | $135 \times 10^{-7}$ | Fe + 0.06 C, 0.38 Mn. |
| 420 stainless steel | $108 \times 10^{-7}$ | Fe + 12–14 Cr, 1.0 Mn, 1.0 Si, 0.15 C. |
| Cartridge brass | $199 \times 10^{-7}$ | 70 Cu, 30 Zn. |

An illustrative procedure for fabricating a transmitting optical subassembly in accordance with the invention may be more fully understood by reference to the drawings. The Figures provided are schematic cross-sectional views of subassembly components, and suitable tooling for subassembly fabrication, not necessarily in true proportion or to scale.

Figure 1:
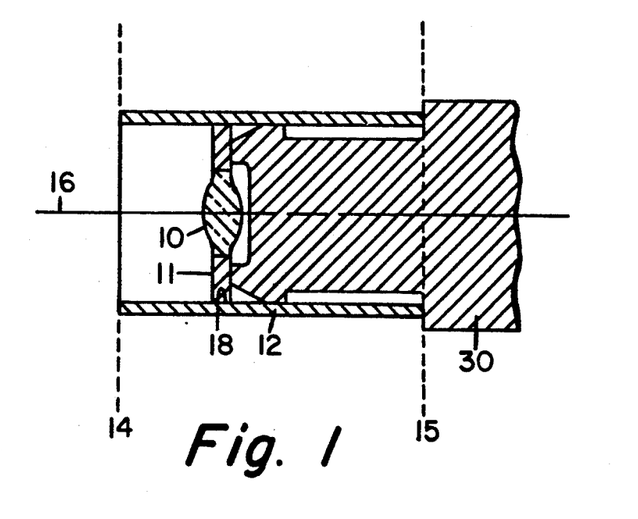
FIG. 1 shows apparatus for mounting a lens in an optical mounting tube.

As shown in FIG. 1, the mounting of a convergent glass lens 10 within an optical mounting tube 12 may be accomplished by means of a mounting fixture 30. Fixture 30 is adapted to position the lens longitudinally and with proper orientation of lens optical axis 16 within tube 12, wherein it may be fixed by soldering, spot welding, or the like. Fixture 30 thus positions lens 10 at an appropriate location between the so-called object end of the tube, indicated by the broken line 14 defining one of the tube endfaces, and the image end of the tube indicated by broken line 15 defining the other tube endface.

The preferred convergent lens is a pressed glass lens which is hermetically sealed at a centered position within a metal support ring 11, such that the optical axis 16 of the lens is coaxial with the ring and thus with the geometric axis or centerline of tube 12 (the latter axis thus also falling on and being shown as axis 16). Lenses sealed to such support rings, which form no part of the present invention but are instead described and claimed in copending, commonly assigned U.S. patent application Ser. No. 07/785,467, filed Oct. 31, 1991, offer the advantage of improved optical axis control and convenient mounting to metal support tubing, for example by laser or other spot welds applied at the ring/tube interface 18.

Figure 2:
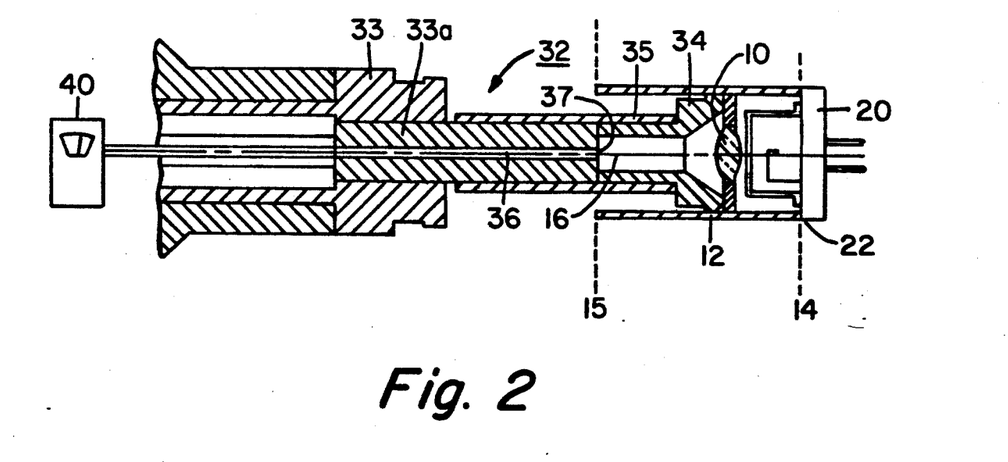
FIG. 2 shows apparatus for positioning a light source at the object end of an optical mounting tube in precise alignment with an optical coupling point defined thereby.

FIG. 2 of the drawing illustrates means for accurately positioning a solid state light source for mounting on optical mounting tube 12 containing lens 10. As shown in FIG. 2, light source 20 comprising a laser diode package is being positioned at object end 14 of tube 12 in an alignment such that light from the diode can be focused by lens 10 to form a source image or point at image end 15 of the tube. Located partially within and extending from the image end of the tube are fixtured optical sensing means 32, used to determine when proper light source positioning and focusing are achieved.

Sensing means 32 principally comprises an optical fiber termination member 33, an optical fiber 36, and a spacing member 34. Optical fiber 36 is disposed in the precision bore of a ceramic connector ferrule 33a constituting a component of termination member 33, the fiber terminating therein at fiber endface 37. Ferrule 33a is sleeved to spacing member 34 by sleeve 35.

The selected point at which focusing of light from the source is desired is fiber endface 37, this endface being located, in the preferred subassembly, at a point which is both on optical axis 16 and within the particular source image plane corresponding with tube end plane 15. Proper positioning of fiber endface 37 at the selected optical coupling point in that source image plane is insured by spacing member 34, which is of a length just sufficient to stop ferrule 33a and fiber endface 37 at plane 15 when inserted into sleeve 35.

In order to determine the amount of optical power coupled into optical fiber 36 though fiber endface 37, fiber 36 is connected to optical power meter 40 which measures the optical power being carried by the fiber. Proper positioning of diode source 20 is then achieved by activating and moving the source until maximum optical power (or a lesser selected level of power coupling) is recorded by meter 40. When this position is established, source 20 is permanently mounted on the object end of tube 12 by welding, soldering, adhesive bonding, or other suitable attachment applied at source/tube interface 22.

Figure 3:
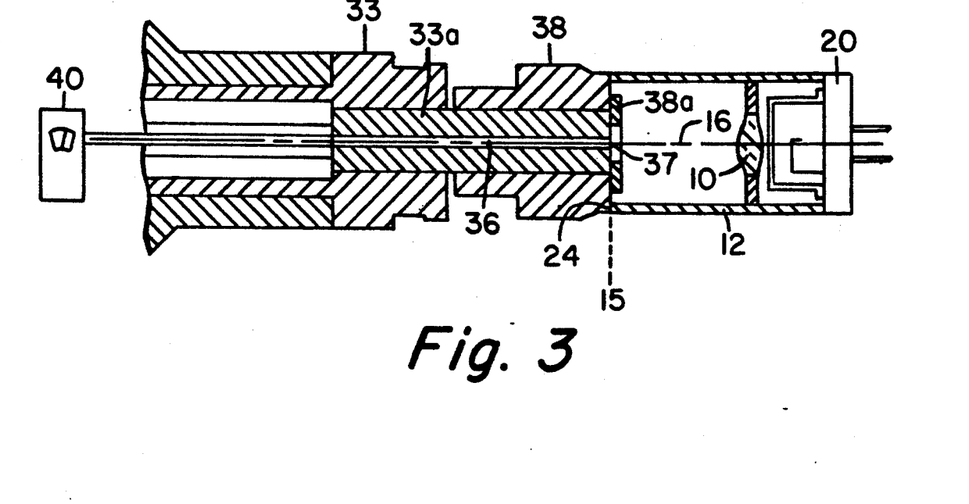
FIG. 3 shows apparatus for mounting optical fiber receiving means at the image end of an optical mounting tube in precise alignment with the optical coupling point thereof.

FIG. 3 of the drawing illustrates means for accurately positioning and mounting optical fiber receiving means at the imaging end of tube 12. As shown in FIG. 3, the receiving means comprise a ferrule receiver 38 and ferrule stop member 38a, these being configured to receive a conventionally terminated optical fiber. Conventional termination is by means of a coupler or connector incorporating a ferrule of ceramic or other hard material, these being common components of optical fiber connectors of standard ST, SC, FC or PC/FC type.

Accurate positioning of ferrule receiver 38 at image end 15 of mounting tube 12 is achieved using an optical fiber 36 terminating in standard connector-type termination member 33 as in FIG. 2. Again, termination member 33 includes a ceramic ferrule 33a within the precision bore of which is positioned an optical fiber 36. Optical fiber 36 terminates at fiber endface 37, the other end of the fiber being connected to optical power meter 40 which measures power coupled into fiber endface 37.

Ferrule 33a is inserted into ferrule receiver 38 until it reaches stop member 38a, this member being adapted to stop the insertion of ferrule 33a at the point where the ferrule and thus fiber endface 37 are substantially coplanar with the end face of receiver 38. Fiber 36 is also typically concentric with ferrule 33a, and thus with termination member 33 and ferrule receiver 38. Although not shown in FIG. 3, ferrule 33a and similar ferrules used in commercial optical fiber connectors may have a slightly convex curvature, resulting in a very slight protrusion of fiber endface 37 outwardly beyond the end plane of ferrule receiver 38, but such is readily compensated for during the final positioning of the receiver on the mounting tube as hereinafter described.

With these components assembled as shown, light source 20 is activated, the assembly is positioned against the image end of tube 12, and is then axially and translationally adjusted to determine the point at which maximum optical power (or a lesser selected level of optical power) is coupled into fiber endface 37. This location will be indicated by a corresponding optical power reading at meter 40. The location thus determined will correspond to the position at which fiber endface 37 falls in or near to image plane 15 and on optical axis 16 of lens 10, since this was the position of the source image point for the lens/source combination assembled as shown in FIG. 2

Ferrule receiver 38 is next laser or spot welded, soldered, or otherwise permanently attached to tube 12, thus fixing the optical coupling characteristics of the device. Again, attachment may be at location of maximum power coupling, or the the receiver may instead be axially translated a predetermined distance along axis 16, so that a slight defocusing of light from the source at fiber endface 37 is achieved, and then fixed to tube 12 in the axially translated position. As previously noted, this defocusing can reduce the sensitivity of the device to fiber misalignment errors caused by ferrule or ferrule receiver defects or the like.

The axial translation distance to be selected for defocusing, if desired, is most conveniently determined in terms of a coupled power reduction into the fiber rather than in terms of a measured distance (in microns) between the coupling point and the focused source image. In one illustrative example of this desensitization, we have found that an axial translation of receiver 38 sufficient to reduce coupled optical power from a peak value of +4 dBm to a defocused value of −3 dBm resulted in a 40% reduction in the sensitivity of the device to fiber misalignment in the ferrule assembly.

Figure 4:
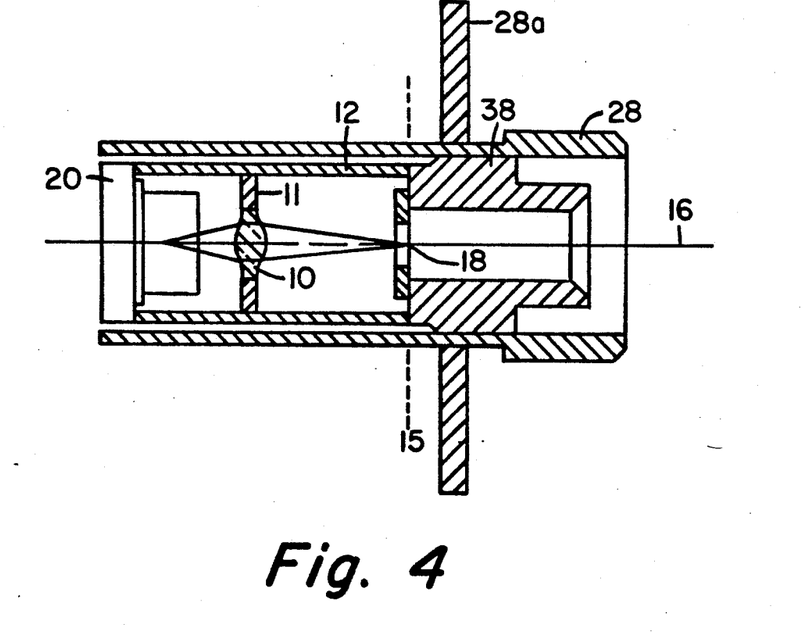
FIG. 4 shows a transmitting optical subassembly provided in accordance with the invention.

FIG. 4 of the drawing illustrates a specific example of a preferred transmitter optical subassembly provided in accordance with the invention. As shown in FIG. 4, the subassembly comprises a light source 20 and a fiber connector ferrule receiver 38 mounted by laser welding at opposing ends of optical mounting tube 12. In that subassembly, light source 20 could comprise a laser diode such as a PCO PLD-1300R-K-0097 laser diode commercially purchased from PCO Incorporated of Chatsworth, Calif., having a light-emitting region disposed on the lens optical axis and within the object end of the tube. Ferrule receiver 28, having a length of about 5.5 mm, an inside diameter of about 2.5 mm, and an outer diameter of about 6.2 mm, could be fabricated of Type 304L austenitic stainless steel. Optical mounting tube 12, having a length of about 8 mm, an inside diameter of about 4.9 mm, and an outer diameter of about 5.6 mm, is best made of Type 304L austenitic stainless steel as well.

Lens 10 mounted within tube 12 in FIG. 4 may be any convergent lens adapted to focus light from source 20 at source image point 18 on lens optical axis 16, and is most preferably an aspheric lens formed of an alkali aluminofluorophosphate optical glass having a composition, in weight percent, of about 39.2 $P_2O_5$, $Na_2O$, 4.3 F, 24.2 PbO, 20.1 BaO, 2.0 $Li_2O$, and 5.2 $Al_2O_3$. The lens is supported by support ring 11 fabricated of Type 304L steel, the support ring being laser-welded to the inner wall of the optical mounting tube.

As shown in FIG. 4, source image point 18 lies in plane 15 which constitutes the end plane of tube 20 as well as the plane in which the endface of an optical fiber supported by a precision ferrule inserted in receiver 38 would approximately be located. Thus plane 15 can be considered to contain the optical coupling point for the device, as well as being the source image plane for lens, the end plane of tube 20, and plane containing the tube/-receiving ferrule connection points. Thus the optical coupling point in this design would correspond exactly to the source image point, instead of being slightly offset therefrom along optical axis 16 for reduced coupling sensitivity as hereinabove described.

In the optical transmitter shown in FIG. 4, there is also provided an added strength tube 28 which is spaced from but extends substantially the entire length of optical mounting tube 12. This tube may suitably be formed also from Type 304L stainless steel, having an inside diameter of about 6.2 mm and a length of about 17.9 mm to fully encase the device. This strength tube 28, which further incorporates a mounting flange 28a for mounting the transmitter subassembly within a larger optoelectronic system, is most preferably joined to the optical components of the subassembly by laser welding attachment or the like to receiving ferrule 38. Attached in this way, strength tube 28 provides substantially complete isolation of optical mounting tube 12 and its incorporated optical components from mechanical stresses incurred during subassembly mounting or subsequent use.

The performance advantages of transmitter optical subassemblies provided utilizing the preferred materials and structure above described are several. First, because of the balanced thermal expansion characteristics of the austenitic stainless steel mounting components and the preferred alkali fluorophosphate lens glasses (including the desirable relationship between lens refractive characteristics and temperature), the subassembly exhibits substantial independence from temperature effects which otherwise degrade high or low temperature device operation. Hence the expansion of the mounting tube is sufficiently compatible with dimensional changes in the lens that only minor changes in coupled power are observed to result from changes in temperature of the device.

Secondly, because the connecting points at which the ferrule receiver is mounted on the optical mounting tube lie on or close to the plane of optical coupling for the device, rotational shifts in the position of the ferrule receiver have only minor effects on coupling efficiency. Thus, for example, if a minor angular offset in the position of the ferrule receiver occurs in the course of device fabrication, no translation of the fiber stop position relative to the source image point of the device will occur. This means that only the relatively small coupling losses caused by angular source beam misalignment are possible.

Of course, compensation for other sources of thermally induced coupling losses in these subassemblies is also possible within the scope of the present invention. For example, in non-connectorized modules which have large magnification of the source in the image plane, the location of the source image is particularly sensitive to the temperature of the module. This is the result of both relative shifts in axial position between the laser diode and the lens, and changes of lens thickness, refractive index, and curvature. The former effect results from differential thermal expansion between the shorter diode subcarrier or submount and the longer lens mounting tube.

Athermalization of this type of module can be improved by appropriate selection of lengths and materials for the laser diode submounting and lens mounting tube. To a first approximation this can be done by setting the ratio of the tube length to submount length equal to the ratio of the submount thermal expansion coefficient to the mounting tube expansion coefficient. Further adjustment from this point is necessary to compensate for thermally induced changes of lens focal length.

The added benefits of axial source beam defocusing in terms of device desensitization, and the advantages of the added strength tube in achieving more stable device performance, have already been noted. Also important, however, are the economic advantages of the inventive fabrication method with respect to device production efficiency, and the repeatability of that method. Hence, device assembly utilizing fixtured prealignment of light source, lens, and fiber receiver components as hereinabove described offers both simpler device construction and a process which can substantially improve selection rates and reduce fabrication costs for these transmitters.

Of course, while the invention disclosed herein has been described with respect to specific materials and specific procedures applicable to the fabrication of improved transmitter optical subassemblies in accordance therewith, it will be recognized that those materials and procedures are presented for purposes of illustration only and are not intended to be limiting. Thus numerous modifications and variations upon the compositions, structures, and processes specifically described herein will doubtless be resorted to by those skilled in the art within the scope of the appended claims.

We claim:

1. A transmitter optical subassembly for transmitting an optical signal into the end of an optical fiber connected thereto which comprises:
   a convergent lens mounted within an optical mounting tube, the tube having object and image ends, the lens having an optical axis substantially parallel with the center axis of the mounting tube, and the tube having a length such that, for an object positioned at the object end thereof the lens forms an image of the object at or near the image end thereof;
   a solid state light source mounted at the object end of the tube, said source being mounted at a position on or proximate to the lens optical axis such that light from the source and traversing the lens is focused at a source image point which is on or proximate to the lens optical axis within a selected source image plane at or near the image end of the tube; and
   optical fiber receiving means mounted at the image end of the tube, said receiving means being attached to the tube at one or more attachment points lying within or closely proximate to the source image plane and the receiving means being positioned such that, for an optical fiber received therein and terminating at a fiber endface providing an optical coupling point, the optical coupling point is disposed on the optical axis and at or slightly offset from the source image point.

2. A transmitter optical subassembly in accordance with claim 1 wherein the optical mounting tube is a one-piece cylindrical metal tube and wherein the optical axis of the lens coincides with the center axis of the mounting tube.

3. A transmitter optical subassembly in accordance with claim 2 wherein the solid state light source is a laser diode source having a light-emitting region disposed on the lens optical axis and within the object end of the tube.

4. A transmitter optical subassembly in accordance with claim 3 wherein the optical coupling point is situated at an offset position on the optical axis and within ±250 microns of the position of the source image point for the subassembly.

5. A transmitter optical subassembly in accordance with claim 1 which further includes physical shielding means attached to the subassembly, such means comprising a rigid tube coaxial with but spaced from the optical mounting tube and at least partially enclosing said subassembly.

6. A transmitter optical subassembly in accordance with claim 3 wherein the optical fiber receiving means comprise a ferrule receiver adapted for insertion of a connectorized, end-terminated optical fiber.

7. A transmitter optical subassembly in accordance with claim 1 wherein the lens is composed of a high-expansion optical glass.

8. A transmitter optical subassembly in accordance with claim 7 wherein the high expansion optical glass is selected from the group consisting of alkali phosphate, alkali fluoro-phosphate, alkali alumino-phosphate, and alkali alumino-fluoro-phosphate glasses having average linear coefficient of thermal expansion of at least about $125 \times 10^{-7}/°$ C. over the temperature range of $20°-300°$ C.

9. A transmitter optical subassembly in accordance with claim 7 wherein the high expansion optical glass is an alkali alumino-fluoro-phosphate glass having an average linear coefficient of thermal expansion in the range of about $150-200 \times 10^{-7}/°$ C. over the temperature range of $20°-300°$ C.

10. A transmitter optical subassembly in accordance with claim 2 wherein the optical mounting tube is composed of a metal selected from the group consisting of stainless steels and brass.

11. A transmitter optical subassembly in accordance with claim 10 wherein the optical mounting tube is composed of a metal selected from the group consisting of austenitic stainless steels and 400 Series stainless steels.

12. A transmitter optical subassembly in accordance with claim 1 wherein the optical source is contained in a metal enclosure, and wherein the ratio of the length of the optical mounting tube to the length of the metal enclosure is approximately equal to the ratio of the thermal expansion coefficient of the metal enclosure to the thermal expansion coefficient of the optical mounting tube.

13. A method for making a transmitter optical subassembly for transmitting an optical signal into the end of an optical fiber connected thereto which comprises the steps of:
   mounting a convergent lens within a unitary optical mounting tube, the tube having an object end, an image end, and a length at least sufficient to permit the imaging of a light source positioned at the object end as an image at or near the image end, the lens having an optical axis and being positioned for mounting so that the optical axis is parallel with the geometric axis of the tube;
   positioning fixtured optical sensing means on the lens optical axis at the image end of the tube;
   mounting a solid state light source at the object end of the tube, the source being first positioned for mounting so that light from the source is focused at a source image point, the source image point lying on the optical axis and in a source image plane transverse to the optical axis which is proximate to or contains the sensing means;
   positioning optical fiber receiving means for mounting at the image end of the tube, said receiving means containing an optical pickup fiber terminating at a fiber endface and being positioned such that the fiber endface is disposed at an optical coupling point which is on the optical axis and at or closely proximate to the source image point, said position being determined by light from the source coupled into the optical pickup fiber endface; and mounting the optical fiber receiving means thus positioned by attachment to the tube at one or more attachment points lying within or closely proximate to the source image plane.

14. A method in accordance with claim 13 wherein the fixtured optical pickup means comprise a fixture-mounted optical pickup fiber connected to an optical power meter.

15. A method in accordance with claim 13 wherein the light source is a laser diode having an active light emitting region, and wherein the laser diode is positioned for mounting with the light emitting region disposed on the optical axis of the lens and within the optical mounting tube.

16. A method in accordance with claim 15 wherein the light source is positioned for mounting at a location effective to displace the source image point along the optical axis from the location of the optical sensing means, thus to provide defocusing of the light from the light source at the location of the sensing means.

17. A method in accordance with claim 14 wherein the receiving means is a receiving ferrule for a connectorized, end-terminated optical fiber, and wherein the receiving ferrule contains an optical pickup fiber having a fiber endface and coupled to an optical power meter for determining the amount of light coupled into the fiber endface.

18. A method in accordance with claim 17 wherein the receiving ferrule is mounted on the optical mounting tube at a location such that the fiber endface is displaced along the optical axis from the source image point, thus to provide defocusing of the light from the light source at the fiber endface.

19. A method in accordance with claim 18 wherein the location is such that the position of the fiber endface is within ±250 microns of the position of the source image point.

* * * * *

UNITED STATES PATENT AND TRADEMARK OFFICE
CERTIFICATE OF CORRECTION

PATENT NO. : 5,216,730
DATED : June 1, 1993
INVENTOR(S) : DeMerritt, et al

It is certified that error appears in the above-indentified patent and that said Letters Patent is hereby corrected as shown below:

Column 9, line 51, should be ---5.0 $Na_2O$---.

Signed and Sealed this

Sixth Day of June, 1995

Attest:

BRUCE LEHMAN

Attesting Officer

Commissioner of Patents and Trademarks